(12) United States Patent
You

(10) Patent No.: US 7,423,647 B2
(45) Date of Patent: Sep. 9, 2008

(54) APPARATUS AND METHODS OF SELECTING SPECIAL CHARACTERS IN A MOBILE COMMUNICATION TERMINAL

(75) Inventor: Sung Bong You, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 10/036,377

(22) Filed: Jan. 7, 2002

(65) Prior Publication Data

US 2002/0135579 A1 Sep. 26, 2002

(30) Foreign Application Priority Data

Jan. 16, 2001 (KR) ............................. 2001-0002390

(51) Int. Cl.
  G09G 5/00 (2006.01)
  G06T 11/00 (2006.01)
  H03M 1/247 (2006.01)
(52) U.S. Cl. ...................... 345/467; 345/169; 345/171; 345/472.3; 341/22
(58) Field of Classification Search ................. 345/685, 345/467, 468, 469, 470, 168–172, 156, 160–162, 345/472.3; 382/185; 341/22, 28; 704/3–5, 704/9; 715/529–531, 536, 856, 540–541, 715/700, 759, 764, 783, 780–781, 808–809; 455/566
See application file for complete search history.

(56) References Cited

U.S. PATENT DOCUMENTS

| | | | | |
|---|---|---|---|---|
| 5,378,068 A | * | 1/1995 | Hua | 400/110 |
| 5,467,170 A | * | 11/1995 | Wilson et al. | 399/81 |
| 5,623,612 A | | 4/1997 | Haneda et al. | 715/536 |
| 5,631,643 A | | 5/1997 | Hisamori et al. | |
| 5,661,476 A | * | 8/1997 | Wang et al. | 341/22 |
| 5,706,450 A | * | 1/1998 | Shaiman et al. | 715/536 |
| 5,742,505 A | * | 4/1998 | Fushimoto et al. | 704/2 |
| 5,940,847 A | * | 8/1999 | Fein et al. | 715/540 |
| 5,977,887 A | | 11/1999 | Grimmett | 715/856 |
| 6,016,142 A | * | 1/2000 | Chang et al. | 715/763 |
| 6,229,919 B1 | | 5/2001 | Hirayama | |
| 6,487,424 B1 | * | 11/2002 | Kraft et al. | 455/566 |
| 6,708,214 B1 | * | 3/2004 | La Fleur | 709/226 |
| 6,851,877 B1 | * | 2/2005 | Liebhold | 400/486 |
| 6,870,528 B2 | * | 3/2005 | Ichikawa | 345/171 |
| 6,963,332 B1 | * | 11/2005 | Watanabe | 345/161 |
| 2002/0077808 A1 | * | 6/2002 | Liu et al. | 704/10 |
| 2002/0085772 A1 | | 7/2002 | Lee | |
| 2002/0196163 A1 | | 12/2002 | Bradford et al. | |
| 2003/0017858 A1 | | 1/2003 | Kraft et al. | |
| 2003/0119551 A1 | * | 6/2003 | Laukkanen et al. | 455/566 |
| 2004/0155869 A1 | * | 8/2004 | Robinson et al. | 345/168 |
| 2005/0060138 A1 | * | 3/2005 | Wang et al. | 704/1 |
| 2005/0169527 A1 | * | 8/2005 | Longe et al. | 382/177 |

* cited by examiner

Primary Examiner—Wesner Sajous
(74) Attorney, Agent, or Firm—Ked & Associates, LLP

(57) ABSTRACT

Apparatus and methods of selecting special characters in a mobile communication terminal are provided. The method includes storing a set of European alphabet letters in a memory, inputting an alphabet letter to be converted in a European alphabet letter, determining a mode conversion key has been activated, displaying a plurality of European alphabet letters corresponding to the inputted alphabet letter on a pop-up window when it is determined that the mode conversion key has been activated, wherein the European alphabet letters are read from the memory, and selecting a desired one of the displayed European alphabet letters.

39 Claims, 3 Drawing Sheets

FIG.3
| A | A | Á | À | Ä | Ã | Â | Å | a | a | á | à | ä | ã | â | å |
|---|---|---|---|---|---|---|---|---|---|---|---|---|---|---|---|
| C | C | Ç | | | | | | c | c | ç | | | | | |
| E | E | É | È | Ë | Ê | | | e | e | é | è | ë | ê | | |
| I | I | Í | Ì | Ï | Î | | | i | i | í | ì | ï | î | | |
| O | O | Ó | Ò | Ö | Õ | Ô | | o | o | ó | ò | ö | õ | ô | |
| U | U | Ú | Ù | Ü | Û | | | u | u | ú | ù | ü | û | | |
FIG.4A
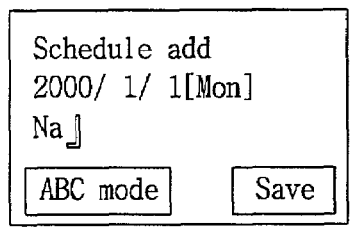
FIG.4B
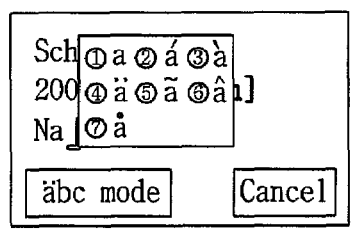
FIG.4C
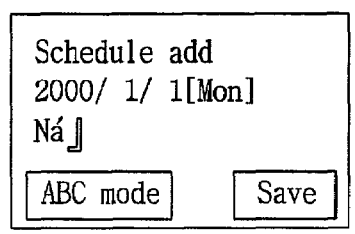

APPARATUS AND METHODS OF SELECTING SPECIAL CHARACTERS IN A MOBILE COMMUNICATION TERMINAL

BACKGROUND OF THE INVENTION

1. Field of the Invention

The invention relates to a mobile communication terminal, and more particularly, to apparatus and methods of selecting special characters in a mobile communication terminal.

2. Background of the Related Art

Generally, as the functions of mobile communication terminals (hereinafter abbreviated "terminal" or "terminals") develop, character input functions are more frequently used. Such functions used to be just for inputting, for example, names into a phone directory. Lately, terminals have functioned as a personal digital assistant (PDA), as a time scheduler, for Internet communication, and the like, as well as a phone directory, thereby requiring more character input. Therefore, in order to provide users with various character input functions, character inputs for various languages are required. Specially, when alphabet letters are edited in an editing mode, inputs for special characters, such as alphabet letters from the European alphabet, for example, "ë, Ë or e", are required as well as the basic English language 26 letter alphabet.

A related art method of selecting special characters includes the steps of selecting a predetermined alphabet letter and selecting an European alphabet letter by a toggle method using a predetermined key during a special character input mode.

For instance, to input an European alphabet letter "À", as shown in Table 1 below, a user, first pushes a key "2 (A,B,C)" on a key pad to input the alphabet letter "A", and then pushes a predetermined key, in this case "0", to select a special character input mode. Once the user selects the special character input mode, a plurality of European alphabet letters, which are stored as related to or associated with the alphabet letter "A", are displayed on an LCD screen, as shown in Table 2 below. In this case, "_" indicates the location of the cursor, that is, the location where the special character is required, and two or three European alphabet letters are displayed on the screen therebelow.

TABLE 1

Store phone number
0123-456-7890
Please input name!
MOOA_

TABLE 2

Store phone number
0123-456-7890
Please input name!
MOOA_
ÀÁ Â

When a plurality of the European alphabet letters are displayed, the user pushes the key "0", known as the "toggle key", repeatedly to search the displayed European alphabet letters. That is, when the key "0" is pushed repeatedly, the plurality of the European alphabet letters show up in the following order: À Á Â. The user then selects the desired "À" among the toggled European alphabet letters.

However, this related art method of searching for special characters requires a minimum of two key inputs (2,0) and a maximum of seven key inputs (2,0,0,0,0,0,0) to select the desired European alphabet letter. That is, the user has to push the keys "2" and "0" to select "À". Further, the user has to push the keys "2" and "0", and then push the key "0" successively five times to select "Å".

Moreover, the related art method of searching for special characters requires the user to push the key "0" an additional five times if the user mistakenly passes the search location of the desired European alphabet letter. Furthermore, when a particular European alphabet letter is not available, the user will only recognize this through a plurality of trial and error inputs. Consequently, the related art method of searching for special characters is inconvenient and requires a plurality of key manipulations, thereby preventing fast character input.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

The invention is directed to a method of selecting special characters in a mobile communication terminal that substantially obviates one or more of problems of the related art method discussed above.

Another object of the invention is to provide a method of selecting special characters in a mobile communication terminal having convenient key manipulation.

Yet another object of the invention is to provide a method of selecting special characters in a mobile communication terminal which is less time consuming than related art methods with less key manipulations.

A further object of the invention is to provide a method of selecting special characters in a mobile communication terminal utilizing software, without having to provide the terminal with additional hardware.

To achieve at least the above objects and other advantages in whole or in part and in accordance with the purposes of the invention, as embodied and broadly described herein, a method of selecting special characters in a mobile communication terminal according to the invention includes inputting an alphabet letter in an editing mode, displaying a plurality of European alphabet letters corresponding to the inputted alphabet letter, wherein a series of numbers are associated with the European alphabet letters, respectively, and selecting one of the European alphabet letters using a numeral key on a key pad.

To further achieve at least the above objects and other advantages in whole or in part and in accordance with the purposes of the invention, as embodied and broadly described herein, a method of selecting special characters in a mobile communication terminal includes inputting an alphabet letter, sensing activation of a mode conversion key, displaying input-available European alphabet letters on an additional screen if activation of the mode conversion key is sensed, and selecting one of the displayed European alphabet letters.

To even further achieve at least the above objects and other advantages in whole or in part and in accordance with the purposes of the invention, as embodied and broadly described herein, a method of selecting special characters in a mobile communication terminal includes storing a set of European alphabet letters in a memory, inputting an alphabet letter to be changed, sensing activation of a mode conversion key, displaying a plurality of European alphabet letters corresponding to the inputted alphabet letter on a pop-up window when activation of the mode conversion key is sensed, wherein the European alphabet letters are read from the memory, and selecting a desired one of the displayed European alphabet letters.

Additionally, to achieve at least the above objects and other advantages in whole or in part and in accordance with the purposes of the invention, as embodied and broadly described herein, apparatus for selecting special characters in a mobile communication terminal include means for inputting an alphabet letter, means for displaying a plurality of European alphabet letters corresponding to the inputted alphabet letter, wherein a series of numbers are associated respectively with each of the European alphabet letters, and means for selecting one of the European alphabet letters.

Moreover, to achieve at least the above objects and other advantages in whole or in part and in accordance with the purposes of the invention, as embodied and broadly described herein, apparatus for selecting special characters in a mobile communication terminal include means for inputting an alphabet letter, means for determining whether a mode conversion key has been activated, means for displaying European alphabet letters on an additional screen if it is determined that the mode conversion key has been activated, means for selecting one of the displayed European alphabet letters.

To even further achieve at least the above objects and other advantages in whole or in part and in accordance with the purposes of the invention, as embodied and broadly described herein, apparatus for selecting special characters in a mobile communication terminal include means for storing a set of European alphabet letters, means for inputting an alphabet letter to be converted to a European alphabet letter, means for determining whether a mode conversion key has been activated means for displaying a plurality of European alphabet letters corresponding to the inputted alphabet letter on a pop-up window when it is determined that the mode conversion key has been activated, wherein the European alphabet letters are read from the memory; and means for selecting a desired one of the displayed European alphabet letters.

Further, to achieve at least the above objects and other advantages in whole or in part and in accordance with the purposes of the invention, as embodied and broadly described herein, a computer-readable medium is provided having stored thereon a sequence of instructions which, when executed by a processor, cause the processor to perform the steps of determining whether an alphabet letter has been input in an editing mode, displaying a plurality of European alphabet letters corresponding to the inputted alphabet letter, wherein a series of numbers are associated respectively with each of the European alphabet letters; and determining whether one of the European alphabet letters has been selected using a numeral key on the keypad.

Furthermore, to achieve at least the above objects and other advantages in whole or in part and in accordance with the purposes of the invention, as embodied and broadly described herein a computer-readable medium is provided having stored thereon a sequence of instructions which, when executed by a processor, cause the processor to perform the steps of determining whether an alphabet letter has been inputted, determining whether a mode conversion key has been activated, displaying European alphabet letters on an additional screen if it is determined that the mode conversion key has been activated, and determining whether one of the displayed European alphabet letters has been selected.

Additionally, to achieve at least the above objects and other advantages in whole or in part and in accordance with the purposes of the invention, as embodied and broadly described herein a computer-readable medium is provided having stored thereon a sequence of instructions which, when executed by a processor, cause the processor to perform the steps of storing a set of European alphabet letters in a memory, determining whether an alphabet letter to be converted to a European alphabet letter has been inputted, determining whether a mode conversion key has been activated, displaying a plurality of European alphabet letters corresponding to the inputted alphabet letter on a pop-up window when it is determined that the mode conversion key has been activated, wherein the European alphabet letters are read from the memory; and determining whether a desired one of the displayed European alphabet letters has been selected.

Also, to achieve at least the above objects and other advantages in whole or in part and in accordance with the purposes of the invention, as embodied and broadly described herein, apparatus for selecting special characters in a mobile communication terminal include a key input unit configured to allow input of an alphabet letter by a user, a display configured to display a plurality of European alphabet letters corresponding to the inputted alphabet letter, wherein a series of numbers are associated respectively with each of the European alphabet letters and a user may select a desired European alphabet letter by pressing a key on the key input unit designating the number respectively associated with the desired European alphabet letter.

Further, to achieve at least the above objects and other advantages in whole or in part and in accordance with the purposes of the invention, as embodied and broadly described herein, apparatus for selecting special characters in a mobile communication terminal include a key input unit configured to allow input of an alphabet letter by a user, a controller that determines whether a mode conversion key has been activated, a display configured to display European alphabet letters on an additional screen if the controller determines that the mode conversion key has been activated, wherein a series of numbers are associated respectively with each of the European alphabet letters and a user may select a desired European alphabet letter by pressing a key on the key input unit designating the number respectively associated with the desired European alphabet letter.

Furthermore, to achieve at least the above objects and other advantages in whole or in part and in accordance with the purposes of the invention, as embodied and broadly described herein, apparatus for selecting special characters in a mobile communication terminal include a memory configured to store a set of European alphabet letters, a key input unit configured to allow input of an alphabet letter to be converted to a European alphabet letter a controller configured to determine whether a mode conversion key has been activated, a display configured to display a plurality of European alphabet letters corresponding to the inputted alphabet letter on a pop-up window when the controller determine that the mode conversion key has been activated, wherein the European alphabet letters are read from the memory and wherein a series of numbers are associated respectively with each of the European alphabet letters and a user may select a desired European alphabet letter by pressing a key on the key input unit designating the number respectively associated with the desired European alphabet letter.

It is to be understood that both the foregoing general description and the following detailed description of the invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements. The drawings, which are included to provide a further understanding of the invention and are incorporated in and constitute a part of this application, illustrate embodiment(s) of the invention and together with the description serve to explain the principle of the invention.

In the drawings:

FIG. 3 shows an exemplary set of European alphabet letters and corresponding English alphabet letters;

FIG. 4A is a schematic diagram of a display showing an editing mode of a mobile communication terminal according to an embodiment of the invention;

FIG. 4B is a schematic diagram of a display showing a plurality of European alphabets displayed on a pop-up window display according to an embodiment of the invention; and FIG. 4C is a schematic diagram of a display showing an input alphabet letter replaced by a specific European alphabet letter.

DETAILED DESCRIPTION OF PREFERRED EMBODIMENTS

Reference will now be made in detail to embodiments of the invention, examples of which are illustrated in the accompanying drawings.

Figure 1:
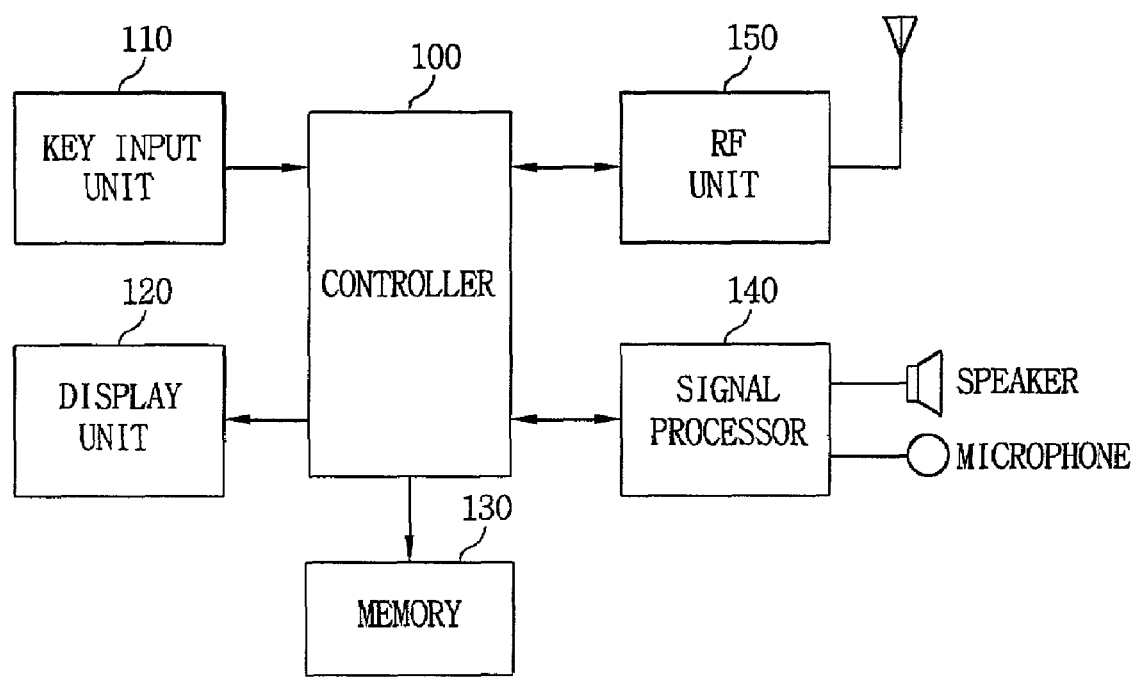
FIG. 1 is a schematic block diagram of a mobile communication terminal according to an embodiment of the invention.

FIG. 1 is a schematic block diagram of a mobile communication terminal according to an embodiment of the invention. Referring to FIG. 1, a controller 100 performs an overall control operation for the terminal and a control operation to edit a European alphabet letter. A key input unit 110 functions as an input device for user data and includes a plurality of numeral keys and various function keys. A display unit 120, which in this embodiment is a liquid crystal display (LCD), indicates a state of the terminal, and illustrates steps of the program.

A memory 130 includes a ROM that stores an operation program, and an EEPROM and RAM that store user data. The memory 130 also has a character string storage area. A signal processor 140 modulates a voice signal input from a microphone into voice data, and outputs the voice data to a RF unit 150. The signal processor 140 also demodulates voice data input from the RF unit 150 into a voice signal and outputs the voice signal to a speaker. In a CDMA (code division multiple access) mobile communication system, the signal processor 140 samples a voice signal input through a microphone, converts the voice signal into a PCM (pulse code modulated) signal, and voice-encodes the PCM signal again. The voice-encoded signal undergoes processing, such as quadrature modulation.

The RF unit 150 transmits/receives various data through an antenna in accordance with instructions from the controller 100. In CDMA, the quadrature-modulated signal is modulated into an analog signal and then the analog signal, which is carried on an RF signal, is transmitted to a base station.

Figure 2:
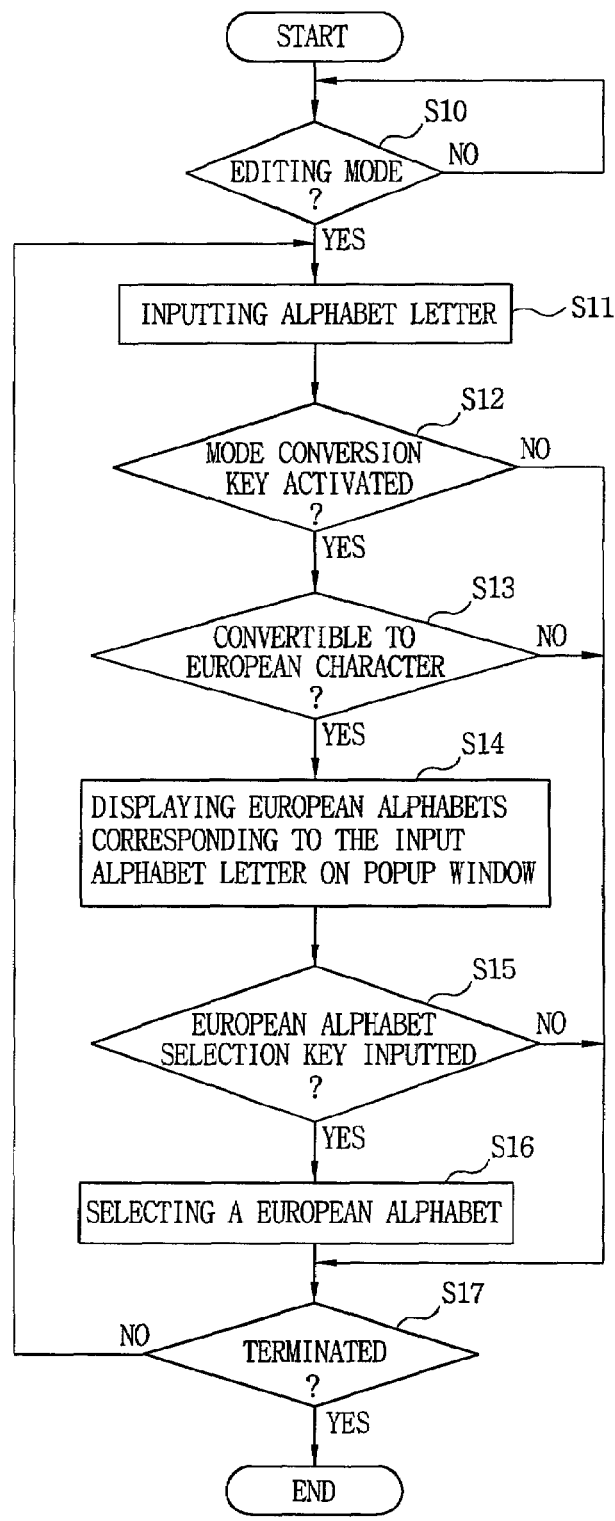
FIG. 2 is an operational flowchart illustrating a method of selecting an European alphabet letter according to an embodiment of the invention.

FIG. 2 illustrates an operational flowchart for selecting a European alphabet letter according to the invention in a mobile communication terminal such as that shown in FIG. 1.

Referring to FIG. 2, specific alphabet letters, for example, A, C, E, I, N, O, U, Y, a, c, e, i, n, o, u, and y, divided into Capital and small letters are stored as a character set of European alphabet letters in the memory 130, as shown in FIG. 3. However, the invention is not limited to the European alphabet but may utilize other character sets relevant to other respective countries and having different valid ASCII, such as other European countries, South American countries, etc.

FIG. 2 is an operational flowchart illustrating a method of selecting specific characters, in this case a European alphabet letter, according to an embodiment of the invention. As shown in FIG. 2, in step S10, the controller 100 checks whether an editing mode has been selected via the key input unit 110. The editing mode is a mode in which edited letters, such as for phone number storage, schedule storage, memo storage, Internet access, etc., are input into the mobile communication terminal. A selected editing mode, such as that shown in FIG. 4A, is displayed on the display unit 120. During the editing mode, a mode conversion key and a save key are displayed at lower left and right hand areas on the display, respectively.

A user inputs an alphabet letter in step S11. For example, when a user inputs the alphabet letter "N" in the editing mode, the controller 100 next checks at step S12 whether a mode conversion key has been activated, or pressed. If the user fails to activate the mode conversion key, the controller 100 proceeds to step S17 to check whether an end key has been activated, or pressed. If, in step S17 it is determined that the end key has not activated, the process goes back to step S11 and awaits input of a next alphabet letter.

Thereafter, the user inputs the alphabet letter "a " in order to input the European alphabet letter "á". If the mode conversion key is selected again while the cursor is on the alphabet letter "a", the controller 100 checks, in step S13, whether the alphabet letter "a" is changeable into a European alphabet letter. The changeable European alphabet letters according to this exemplary embodiment are shown in FIG. 3.

As a result of the checking step, if the inputted alphabet letter is changeable into a European alphabet letter, the controller 100 reads a plurality of European alphabet letters corresponding or relating to the alphabet letter "a" from the character set storage area of the memory 130. The controller 100 displays the read European alphabet letter on a specific area of the display unit 120. That is, plurality of the European alphabet letters are displayed on an extra area of the display unit 120, or a pop-up window, as shown in FIG. 4B. In this case, a series of numbers are associated with the respective European alphabet letters on the display, as shown in FIG. 4B, so that the European alphabet letters may be selected using numeral keys 0 to 9 of the keypad. When the pop-up window appears, the mode conversion key and the cancel key show up on the display at lower left and right-hand areas of the display.

Thus, the user can input the European alphabet letter "á" by pressing the key "2" after having ascertained that the desired European alphabet letter "á" exists among the European characters displayed on the pop-up window. On the other hand, if the desired European alphabet letter is not in the group of European alphabet letters displayed, the user may select another input mode by selecting the mode conversion key at the lower left area of the display. If the user selects the cancel key at the lower right area of the display, the program returns to the editing mode, as shown in FIG. 4A.

In step S15, the controller 100 checks whether the user has input, or pressed a selected key (character key on the key pad) associated with a specific European alphabet letter. For example, if the user presses the key "2", the alphabet letter "a" is replaced by the corresponding European alphabet letter "á", as shown in FIG. 4C.

Thereafter, the above steps are repeated so that the user may input other alphabet and European alphabet letters. When the user presses the save key after completion of the input steps, the controller 100 stores the corresponding user data in the memory 130.

The invention enables a user to input European alphabet letters with a couple of key manipulations, i.e., by activations of a mode switch key and a character key on the key pad, and by displaying available European alphabet letters, to which a series of numbers are associated respectively, on an auxiliary screen, or pop-up window.

Accordingly, the invention enables a user to select a European alphabet letter conveniently with a reduced number of key manipulations in comparison to related art methods.

Moreover, the invention enables a user to input a European alphabet letter without additional hardware by adding a European alphabet letter mode to a terminal having an English mode, a Numeral mode, and an ASCII mode.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of selecting special characters in a hand-held mobile communication terminal, comprising:
   inputting an alphabet letter in an editing mode via a keypad;
   displaying a mode conversion key and a save key in the editing mode;
   displaying on a display a plurality of European alphabet letters, including special characters not used in the English alphabet, corresponding to the input alphabet letter, wherein a series of numbers are displayed on the display associated respectively with each of the European alphabet letters; and
   selecting one of the European alphabet letters using a numeral key on the keypad.

2. The method of claim 1, further comprising checking whether the editing mode has been selected.

3. The method of claim 2, further comprising storing a set of European alphabet letters in a memory.

4. The method of claim 3, wherein the European alphabet letter set includes a plurality of European alphabet letters divided into a Capital letter group and a small letter group.

5. The method of claim 1, wherein the displayed European alphabet letters appear in a pop-up window.

6. The method of claim 5, further comprising displaying the mode conversion key and a cancel key in the editing mode when the pop-up window is displayed.

7. The method of claim 6, wherein the pop-up window disappears when either the mode conversion key or the cancel key is pressed.

8. The method of claim 1, wherein displaying a plurality of European alphabet letters, comprises:
   judging whether the input alphabet letter is changeable into a European alphabet letter; and
   displaying a plurality of European alphabet letters corresponding to the input alphabet letter if the input alphabet letter is changeable into a European alphabet letter.

9. A method of selecting special characters in a mobile communication terminal, comprising:
   inputting an alphabet letter;
   determining whether a mode conversion key has been activated;
   displaying European alphabet letters, including special characters not used in the English alphabet, on an additional screen partially overlaying a screen displaying the input alphabet letter if it is determined that the mode conversion key has been activated; and
   selecting one of the displayed European alphabet letters.

10. The method of claim 9, wherein activation of the mode conversion key activates an editing mode.

11. The method of claim 10, further comprising displaying the mode conversion key and a save key in the editing mode.

12. The method of claim 9, further comprising displaying the European alphabet letters in a pop-up window.

13. The method of claim 12, further comprising displaying the mode conversion key and a cancel key when the pop-up window is displayed.

14. The method of claim 12, wherein the pop-up window disappears when either the mode conversion key or the cancel key is activated.

15. The method of claim 9, wherein a series of numbers are associated respectively with the European alphabet letters.

16. The method of claim 9, wherein the displayed European alphabet letters are selected using numeral keys on a keypad, respectively.

17. The method of claim 9, wherein the step of displaying the European alphabet letters comprises:
   judging whether the input alphabet letter is changeable into a European alphabet letter; and
   displaying a plurality of European alphabet letters corresponding to the input alphabet letter if the input alphabet letter is changeable into a European alphabet letter.

18. A method of selecting special characters in a mobile communication terminal, comprising:
   storing a set of European alphabet letters in a memory;
   inputting an alphabet letter to be converted to a European alphabet letter;
   determining whether a mode conversion key has been activated;
   displaying a plurality of European alphabet letters, including special characters not used in the English alphabet, corresponding to the input alphabet letter on a pop-up window partially overlaying a screen displaying the input alphabet letter when it is determined that the mode conversion key has been activated, wherein the European alphabet letters are read from the memory; and
   selecting a desired one of the displayed European alphabet letters.

19. The method of claim 18, wherein the displayed European alphabet letters are divided into a Capital letter group and a small letter group.

20. The method of claim 18, wherein displaying a plurality of the European alphabet letters comprises:

judging whether the input alphabet letter is changeable into a European alphabet letter;

reading input-available European alphabet letters from the memory if the input alphabet letter is changeable into the European alphabet letter, wherein the European alphabet letters correspond to the input alphabet letter; and displaying the European alphabet letters read from the memory on the pop-up window and associating a series of numbers with the European alphabet letters, respectively.

21. The method of claim 18, wherein the displayed European alphabet letters are selected using numeral keys on a keypad, respectively.

22. Apparatus for selecting special characters in a hand-held mobile communication terminal, comprising:

means for inputting an alphabet letter in an editing mode;

means for displaying on a display a mode conversion key and a save key in the editing mode and a plurality of European alphabet letters, including special characters not used in the English alphabet, corresponding to the input alphabet letter, wherein a series of numbers are displayed on the display associated respectively with each of the European alphabet letters; and means for selecting one of the European alphabet letters.

23. The apparatus of claim 22, further comprising:

means for determining whether the input alphabet letter is changeable into a European alphabet letter; and means for displaying a plurality of European alphabet letters corresponding to the input alphabet letter if the input alphabet is changeable into a European alphabet letter.

24. Apparatus for selecting special characters in a mobile communication terminal, comprising:

means for inputting an alphabet letter;

means for determining whether a mode conversion key has been activated;

means for displaying European alphabet letters, including special characters not used in the English alphabet, on an additional screen partially overlaying a screen displaying the input alphabet letter if it is determined that the mode conversion key has been activated; and means for selecting one of the displayed European alphabet letters.

25. The apparatus of claim 24, further comprising:

means for determining whether the input alphabet letter is changeable into a European alphabet letter; and means for displaying a plurality of European alphabet letters corresponding to the input alphabet letter if the input alphabet letter is changeable into a European alphabet letter.

26. Apparatus for selecting special characters in a mobile communication terminal, comprising:

means for storing a set of European alphabet letters;

means for inputting an alphabet letter to be converted to a European alphabet letter;

means for determining whether a mode conversion key has been activated;

means for displaying a plurality of European alphabet letters, including special characters not used in the English alphabet, corresponding to the input alphabet letter on a pop-up window partially overlaying a screen displaying the input alphabet letter when it is determined that the mode conversion key has been activated, wherein the European alphabet letters are read from the memory; and means for selecting a desired one of the displayed European alphabet letters.

27. The apparatus of claim 26, further comprising:

means for determining whether the input alphabet letter is changeable into a European alphabet letter;

means for reading European alphabet letters from the storing means if the input alphabet letter is changeable into the European alphabet letter, wherein the European alphabet letters correspond to the input alphabet letter; and means for displaying the European alphabet letters read from the storing means on the pop-up window and associating a series of numbers with the European alphabet letters, respectively.

28. A computer-readable medium provided in a hand-held mobile communication terminal and having stored a sequence of instructions which, when executed by a processor, cause the processor to perform the steps of:

determining whether an alphabet letter has been input in an editing mode;

displaying a mode conversion key and a save key in the editing mode;

displaying on a display a plurality of European alphabet letters, including special characters not used in the English alphabet, corresponding to the input alphabet letter, wherein a series of numbers are displayed on the display associated respectively with each of the European alphabet letters; and determining whether one of the European alphabet letters has been selected using a numeral key on a keypad.

29. The computer-readable medium of claim 28, wherein displaying a plurality of European alphabet letters, comprises:

determining whether the input alphabet letter is changeable into a European alphabet letter; and displaying a plurality of European alphabet letters corresponding to the input alphabet letter if the input alphabet letter is changeable into a European alphabet letter.

30. A computer-readable medium having stored a sequence of instructions which, when executed by a processor, cause the processor to perform the steps of:

determining whether an alphabet letter has been input;

determining whether a mode conversion key has been activated;

displaying European alphabet letters, including special characters not used in the English alphabet, on an additional screen partially overlaying a screen displaying the input alphabet letter if it is determined that the mode conversion key has been activated; and determining whether one of the displayed European alphabet letters has been selected.

31. The computer-readable medium of claim 30, wherein displaying the European alphabet letters comprises:

determining whether the input alphabet letter is changeable into a European alphabet letter; and displaying a plurality of European alphabet letters corresponding to the input alphabet letter if the input alphabet letter is changeable into a European alphabet letter.

32. A computer-readable medium having stored a sequence of instructions which, when executed by a processor, cause the processor to perform the steps of:

storing a set of European alphabet letters in a memory;

determining whether an alphabet letter to be converted to a European alphabet letter has been input;

determining whether a mode conversion key has been activated;

displaying a plurality of European alphabet letters, including special characters not used in the English alphabet, corresponding to the input alphabet letter on a pop-up window partially overlaying a screen displaying the input alphabet letter when it is determined that the mode conversion key has been activated, wherein the European alphabet letters are read from the memory; and determining whether a desired one of the displayed European alphabet letters has been selected.

33. The computer-readable of claim 32, wherein displaying a plurality of European alphabet letters comprises:

judging whether the input alphabet letter is changeable into a European alphabet letter;

reading input-available European alphabet letters from the memory if the input alphabet letter is changeable into a European alphabet letter, wherein the European alphabet letters correspond to the input alphabet letter; and displaying the European alphabet letters read from the memory on the pop-up window and associating a series of numbers with the European alphabet letters, respectively.

34. Apparatus for selecting special characters in a handheld mobile communication terminal, comprising:

a key input device configured to allow input of an alphabet letter by a user in an editing mode;

a display configured to display a mode conversion key and a save key in the editing mode and a plurality of European alphabet letters, including special characters not used in the English alphabet, corresponding to the input alphabet letter, wherein a series of numbers are displayed on the display associated respectively with each of the European alphabet letters and a user may select a desired European alphabet letter by pressing a key on the key input device designating the number respectively associated with the desired European alphabet letter.

35. The apparatus of claim 34, further comprising:

a controller configured to determine whether the input alphabet letter is changeable into a European alphabet letter, wherein the plurality of European alphabet letters corresponding to the input alphabet letter are displayed only if the input alphabet letter is changeable into a European alphabet letter.

36. Apparatus for selecting special characters in a handheld mobile communication terminal, comprising:

a key input device configured to allow input of an alphabet letter by a user in an editing mode;

a controller that determines whether a mode conversion key has been activated;

a display configured to display the mode conversion key and a save key in the editing mode and European alphabet letters, including special characters not used in the English alphabet, on an additional screen if the controller determines that the mode conversion key has been activated, wherein a series of numbers are displayed on the display associated respectively with each of the European alphabet letters and a user may select a desired European alphabet letter by pressing a key on the key input device designating the number respectively associated with the desired European alphabet letter.

37. The apparatus of claim 36, wherein the controller determines whether the input alphabet letter is changeable into a European alphabet letter, and a plurality of European alphabet letters corresponding to the input alphabet letter are displayed on the display if the input alphabet letter is changeable into a European alphabet letter.

38. Apparatus for selecting special characters in a handheld mobile communication terminal, comprising:

a memory configured to store a set of European alphabet letters;

a key input device configured to allow input of an alphabet letter to be converted to a European alphabet letter in an editing mode;

a controller configured to determine whether a mode conversion key has been activated;

a display configured to display the mode conversion key and a save key in the editing mode and a plurality of European alphabet letters, including special characters not used in the English alphabet, corresponding to the input alphabet letter on a pop-up window when the controller determines that the mode conversion key has been activated, wherein the European alphabet letters are read from the memory and wherein a series of numbers are displayed on the display associated respectively with each of the European alphabet letters and a user may select a desired European alphabet letter by pressing a key on the key input device designating the number respectively associated with the desired European alphabet letter.

39. The apparatus of claim 38, wherein the controller determines whether the input alphabet letter is changeable into a European alphabet letter and reads European alphabet letters from the memory if the input alphabet letter is changeable into the European alphabet letter, wherein the European alphabet letters correspond to the input alphabet letter, and wherein the European alphabet letters read from the memory are displayed on the pop-up window associated with the series of numbers, respectively.

* * * * *